Dec. 10, 1940.    H. FRIEDRICHSEN ET AL    2,224,597
GASEOUS ELECTRIC DISCHARGE DEVICE
Filed Aug. 11, 1939
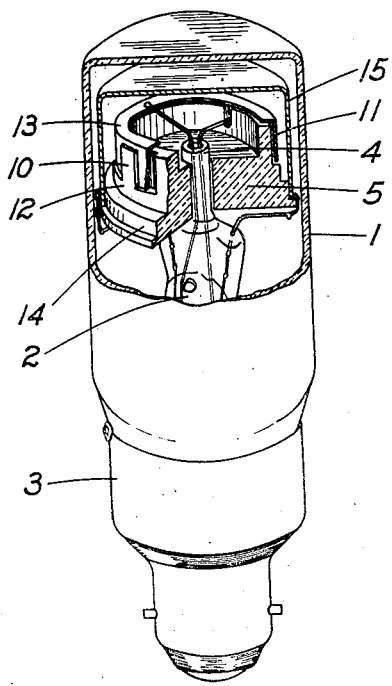
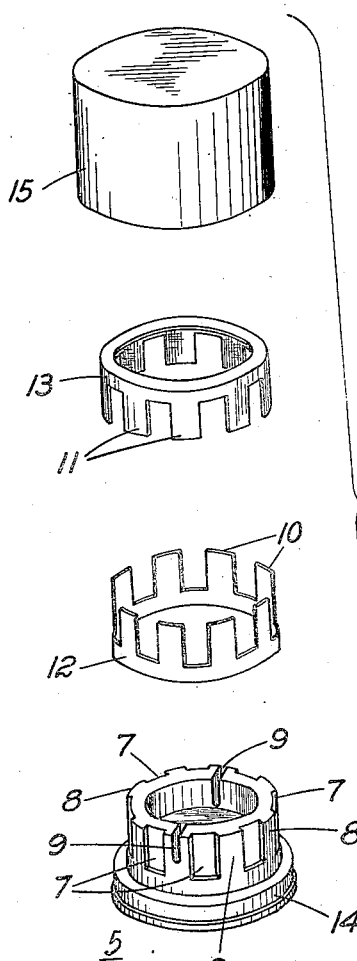
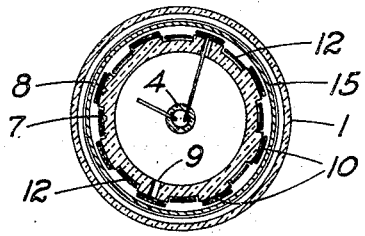
INVENTORS
Heinrich Friedrichsen
Hans Straehler
BY Harry E. Dunham
ATTORNEY Patented Dec. 10, 1940

2,224,597

UNITED STATES PATENT OFFICE 2,224,597

GASEOUS ELECTRIC DISCHARGE DEVICE

Heinrich Friedrichsen, Berlin-Sudende, and Hans Straehler, Berlin-Zehlendorf, Germany, assignors to General Electric Company, a corporation of New York Application August 11, 1939, Serial No. 289,684
In Germany August 23, 1938

2 Claims. (Cl. 250—27.5)

The present invention relates to gaseous electric discharge devices generally and more particularly the invention relates to such devices of the cathode glow type useful for maintaining voltages constant. Certain devices of this type have an auxiliary anode in addition to a main anode and a cathode to facilitate the starting of the main discharge. A compact arrangement of the electrodes is obtained when the cathode is a cylindrical vessel and the two anodes are mounted within the cathode. It is essential that an unobstructed discharge path exist between the cathode and each main anode.

The object of the present invention is to provide a compact, rugged, longlived glow discharge lamp of the above type. Still further objects and advantages attaching to the device and to its use and operation will be apparent to those skilled in the art from the following particular description.

The invention attains its objects by the structure shown in the drawing accompanying and forming part of this specification, in which Fig. 1 is a perspective, partly sectional view of the cathode glow discharge lamp.

Fig. 2 is a perspective view of the electrodes and the insulating support therefor, and Fig. 3 is a sectional view of the lamp illustrated in Fig. 1.

Referring to the drawing the cathode glow discharge lamp comprises a tubular vitreous container I having a stem 2 to which the electrode leads and an exhaust tube are fused. A base 3 to which the electrode leads are connected is cemented to the container I in the usual manner. An insulating support 5, consisting of ceramic material for example, having a central perforation is supported in said container I by the vitreous tube 4 fused to the pinch-part of the stem 2. The support 5 is cylindrical and has a plurality of recesses 7 on the outer surface thereof. The surfaces between said recesses 7 will be termed the projections 8 hereinafter. Said support 5 has notches 9 therein to permit the fastening of the electrode leads to the electrodes. The teeth 10 and 11 of the annular, crown-shaped electrodes 12 and 13, respectively, cover the projections 8 and the recesses 7, respectively, of the support 5.

The electrode 15, which is preferably the cathode, is mounted on and supported by the shoulder 14 of the support 5. The electrodes 12, 13 and 15 are supported and maintained at a fixed distance from each other by the support 5. There is an unobstructed and direct discharge path between the cathode 15 and each of the anodes 12 and 13. The two discharge paths are in close proximity which facilitates the ignition of the main discharge by the constantly operating auxiliary discharge. The shape of the support 5 prevents leakage paths between the electrodes which is of importance, particularly when the electrodes are activated since the activation material sputtered off the electrodes cannot form a short-circuiting path therebetween.

The container I has a discharge conducting gaseous atmosphere therein, such as rare gases, common gases, metal vapors, or mixtures thereof.

It will be understood of course that we contemplate that many changes, substitutions and omissions in the device illustrated may be made by those skilled in the art without departure from the spirit and scope of the invention, for example, when desired the support 5 is omitted and the electrodes 12, 13 and 15 are supported by the electrode leads therefor in the same position with respect to each other as that shown in the drawing. We prefer to use the support 5, however, for the device is more rugged and thinner electrodes may be used when the electrodes are thus supported.

What we claim as new and desire to secure by Letters Patent of the United States, is:

1. A gaseous electric discharge device comprising a container, a plurality of electrodes sealed therein, a gaseous atmosphere therein, two of said electrodes being annular, crown shaped electrodes of different diameter mounted concentrically with respect to each other with the teeth of one of said electrodes behind the space between the teeth of the other of said electrodes.

2. A gaseous electric discharge device comprising a container, a plurality of electrodes sealed therein, a gaseous atmosphere therein, and a cylindrical support of electrical insulating material supporting said electrodes, said support having on the outer surface thereof a plurality of alternating projections and recesses, two of said electrodes being annular, crown shaped electrodes of different diameter and being mounted on said support with the teeth of one of said electrodes covering the projections on said support and the teeth of the other of said electrodes covering the recesses in said support.

HEINRICH FRIEDRICHSEN.
HANS STRAEHLER.